April 26, 1927.
C. K. WOODBRIDGE
1,625,970
SOUND DISTRIBUTING AND TRANSMITTING MEANS AND METHOD
Filed Feb. 21, 1924     2 Sheets-Sheet 2
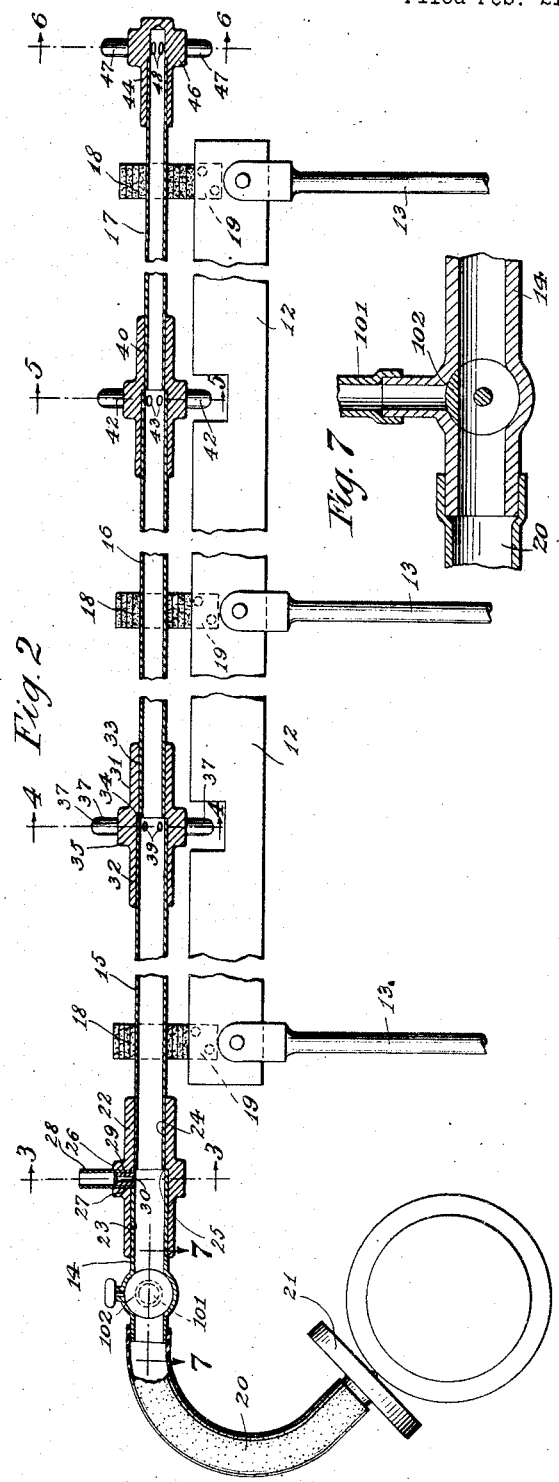
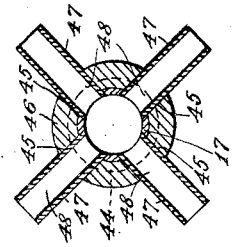
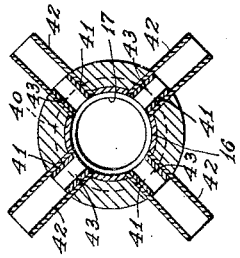
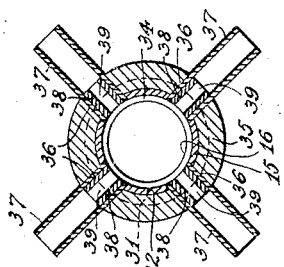
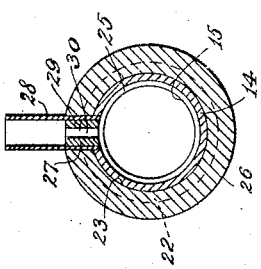
INVENTOR
*Charles K. Woodbridge*
BY
*Ray B. Whitman*
ATTORNEY Patented Apr. 26, 1927.

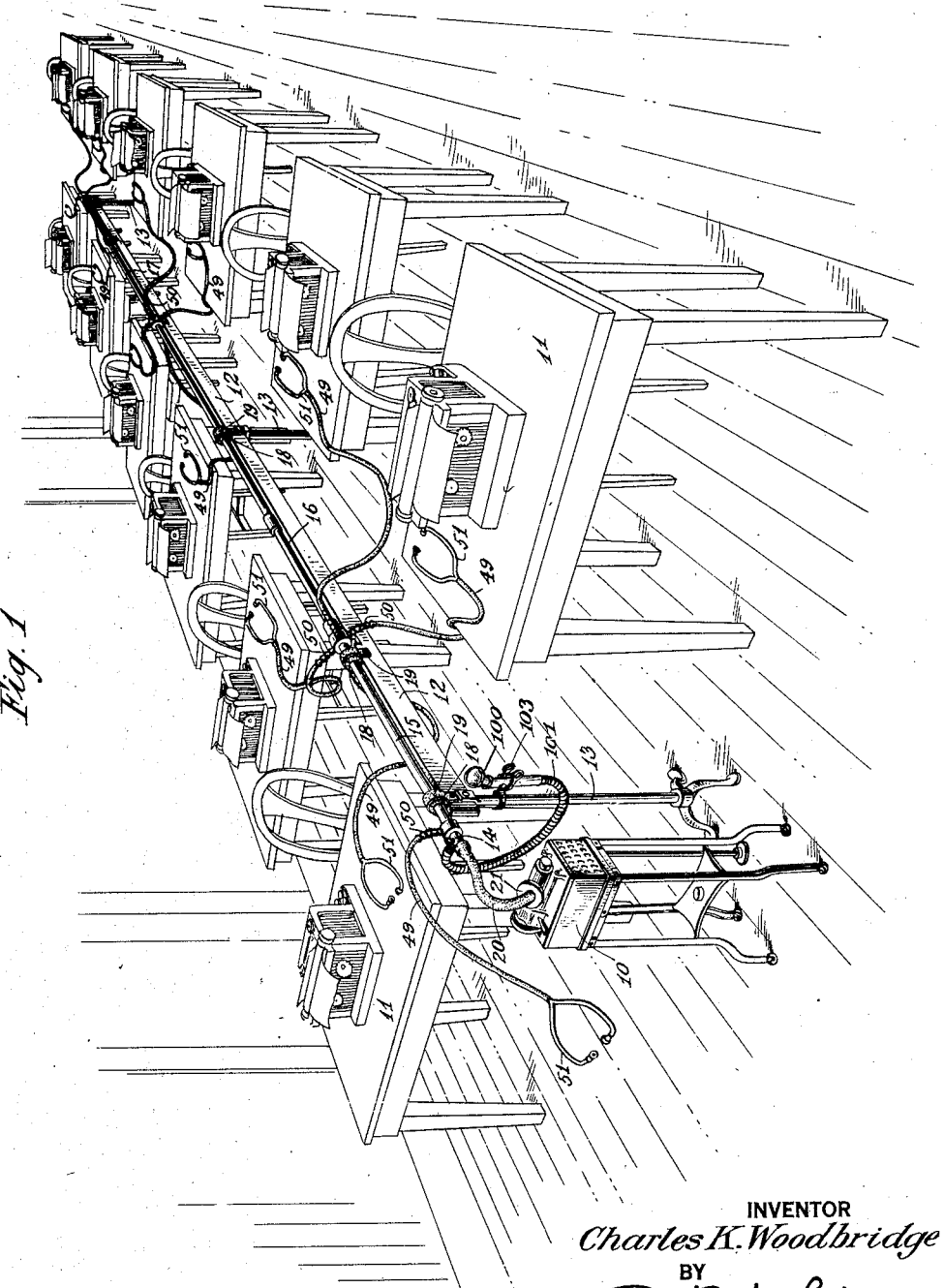

1,625,970

UNITED STATES PATENT OFFICE.

CHARLES K. WOODBRIDGE, OF FLUSHING, NEW YORK, ASSIGNOR TO DICTAPHONE CORPORATION, OF BRIDGEPORT, CONNECTICUT, A CORPORATION OF NEW YORK.

SOUND DISTRIBUTING AND TRANSMITTING MEANS AND METHOD.

Application filed February 21, 1924. Serial No. 694,250.

This invention relates to sound distributing and transmitting means and methods.

An object of the invention is to provide for training typists by orally giving dictation, or instructions, to the individual students of a class, simultaneously in such a manner that the sound will be clearly audible, to each of the students, over the noise produced by the operation of the typewriting machines.

A further object is to provide for using the commercial phonograph, for the purpose of giving the dictation and routine instructions.

Another object is to provide for using a single phonograph for a large number of students, so that each student has the usual listening tube, and so that all other practical working conditions are reproduced.

Another object is to provide for transmitting the voice of the teacher in charge of a class to the students either in conjunction with the operation of the phonograph, or entirely independent of it.

And another object is to provide for distributing and conveying sound which would otherwise be inaudible to different and separated places in a room or in different widely separated rooms, for instance.

A still further object is to provide for distributing and conveying the sound, so that at places different distances from the source, the sounds heard will have substantially the same intensity, volume and other characteristics.

And yet another object is to provide an apparatus, for carrying out the above objects, which is easily made and assembled, and which is readily demountable for storing when not in use In the drawings—

Figure 1 is a perspective view showing a class-room for twelve pupils, fitted with a multiple dictation apparatus made in accordance with this invention.

Fig. 2 is a longitudinal sectional view through the sound-tube shown in Fig. 1, the tube-supporting stand being shown in elevation.

Fig. 3 is a transverse sectional view along the line 3—3 of Fig. 2, this being the instructor's sound-outlet and speaking-tube connection.

Fig. 4 is a similar transverse sectional view along the line 4—4 of Fig. 2, this in the embodiment shown being the connection for the first group of students.

Fig. 5 is a similar view along the line 5—5 of Fig. 2, showing the connection for the second group.

Fig. 6 is a similar view along the line 6—6 of Fig. 2, showing the connection for the third group.

Fig. 7 is a sectional view on the line 7—7 of Fig. 2 showing the connection of a speaking tube to the sound conveying and distributing tube and the optional control mechanism therefor.

Similar reference characters indicate corresponding parts throughout the several figures of the drawings.

To provide for training and instructing a class of pupils, so that the sounds spoken by an instructor or emitted by a phonograph are transmitted to the pupils, individually, there is provided a relatively long sound-conveying tube. This extends from the source of the sound which may be a phonograph 10 (Fig. 1) of the dictation machine type, as shown in the accompanying drawings, or from a mouth-piece 100, preferably located at the front of the room. The sound-conveying tube extends through an aisle between two rows of desks and chairs 11—six in each row—in the arrangement illustrated.

The sound-conveying tube is supported by a long bar or board 12 mounted upon a plurality of spaced supporting standards 13. The tube includes four main sections 14, 15, 16 and 17 (Fig. 1) secured upon the bar 12, which are spaced therefrom by sound-insulating collars 18 of felt or other suitable material held upon the bar by suitable straps 19 which are preferably made of some soft fabric so as to further prevent the transmission of sound from the board to the sound-conveying tube.

The forward end of the sound-conveying tube is connected by a flexible rubber tube 20, connected to the section 14, to the sound-box 21 of the dictation machine. Preferably, the section 14 is provided with a connection to a speaking-tube 101 for the mouth-piece 100. A suitable valve or gate 102 (Fig. 7) is provided for closing either the opening to the rubber tube 20 or for the speaking-tube 101 at will so that the instructor may cut out sound emitted by the dictation machine and give personal instruction through the speaking tube, or, if desired, may give instructions concomitantly with the operation of the phonograph.

The sections of the sound-conveying tube are connected by coupling members, which are shown in cross section in Figs. 3 to 6. As shown, these also serve as sound outlet and distributing means, but it should be understood, that this is not essential and that other such means may be provided. The first coupling member 22 (Figs. 2 and 3) connecting the sections 14 and 15, is provided at one end with a bore 23 to receive the section 14 relatively larger than the bore 24 at the other end into which fits the section 15 of slightly smaller diameter, the ends of the two sections meeting at the point 25. An annulus 26 is formed centrally on the coupling member, and is provided with a radial hole 27. In this hole there is provided an outlet tube or nozzle 28 to which there is, or may be, attached listening tubes, hereinafter described. The size of the orifice in the nozzle 28 may be determined by a bushing 29 provided in it, having a reduced sound-outlet passage 30 therethrough.

It should be noted that at the point 25, at the end of the tube 14 and adjacent the outlet passage 30, the diameter of the passage through the tube being reduced, causes a compression of the sound-wave at this point where it enters the tube 15. This compression of the sound-wave has the effect of increasing the intensity of the sound so that in spite of the fact that part of its energy was lost or spent through the outlet 28, it has about the same intensity as at the point of origin.

The coupling member 31 (Figs. 2 and 4), connecting the tubes 15 and 16, is provided with a bore 32, at one end, into which the tube 15 fits, and a relatively smaller bore 33, at the other end, into which the tube 16 fits, the tubes meeting at a point 34 similar to the point 25. The annulus 35 formed centrally of the bore, preferably has four radial and equally spaced outlet openings 36 to receive nozzles 37 for the attachment of listening tubes. Within the nozzles 37, there are provided reduction bushings 38 having passages 39 therethrough, which are relatively larger in diameter than the passage of the reduction bushing 27 of the first coupling member, so that audibility of the sound will be made to substantially equal that at the first coupling by compensating for the difference in intensity between the sound in the tube 14 and the tube 15.

The third coupling member 40 (Figs. 2 and 5) is substantially the same as the second member, being proportionate, however, to accommodate the ends of the tube 16 and the tube 17 of further reduced diameter. The bushings 41, within nozzles 42 thereof, have their sound-outlet passages 43 of relatively larger diameter than the passages 39 of the second coupling member, for the reasons above explained.

The fourth or terminal member 44 (Figs. 2 and 6) is attached to the extremity of the tube 17, and has a solid side to close the end of the long sound-conveying passage. A plurality of radial passages 45 is formed in the enlarged annulus 46, receiving the nozzles 47 for the listening tubes. The passages 48, through the tubes 47, are relatively larger in diameter than the passages 43 of the third coupling member, for the reasons given, in this case there being no bushing to reduce the passage as in the other nozzles.

The provision of the sound conveying means, above described, allows the reproduction of the dictation machine to be increased in strength above normal to a point at which the desired degree of loudness is obtained at the most distant listening tube without disadvantageous results. Ordinarily, this could not be done because the sound would be so loud at the nearest listening tube that it would be unintelligible. However, according to this invention, the reduction bushings in the nozzles near the sound source allow only that much of the sound to reach these listening tubes which is equal the sound heard at the most remote points and which is the same as would normally be heard, if the dictation machine were operating under normal conditions.

The sound-outlet passages 30, 39, 43 and 48 (Figs. 3 to 6) of the three coupling members and the terminal member, are of proportionately increasing diameter in the order of their placement; while tubes 14, 15, 16 and 17 are of proportionately decreasing diameter so that, while the gradual reductions of the conveying tube causes the sound-waves to be compressed to partially compensate for the reduction in intensity due to dissipation at the outlets along the way, the outlets gradually increase in size to permit a greater volume to pass through. The total of the areas of the outlets 48 can be equal the area of the passage in the tube 17, since there is no need of saving any energy for other use, the apparatus being preferably so designed.

Individual listening tubes 49 (Fig. 1) are attached to the nozzles 28, 37, 42 and 47 and have coiled springs 50, surrounding their inner ends to securely hold them upon the nozzles and to prevent the formation of sharp bends which might eventually crack and break the tube at the points of connection. At the outer ends of the listening tubes, there are provided forked, ear-engaging members 51. The listening tubes are of such length, that the user will have sufficient freedom of movement.

The nozzles 28, 37, 42 and 47 (Figs. 3 to 6) for the listening tubes are made of standard and uniform size so that the tubes may be all alike, the provision of the bushings 29, 38 and 41 permitting this to be done.

The tube sections 14, 15 and 16 have their inside diameters substantially equal to the outside diameter of the one next smaller, so that the sections will telescope and form a compact assemblage of relatively small dimensions.

From the foregoing, it will be seen that by means of this invention, a class of students may be instructed orally, either by machine or by an instructor personally, while the work is actually being done, and irrespective of the disconcerting noises which may be present. It will also be seen that this may be done without annoying any other students in the vicinity who may be occupied with other work. For the sound emitted from the phonograph will not be heard except by those utilizing the listening tubes 49, and even the voice of the instructor need not be raised much above a whisper in giving instructions, because of the efficiency of the sound-conveying and distributing means of this invention. In fact, two classes in the same room may be studying at once, without the one interfering, in any way, with the other.

While the present invention has been described with reference to training typists, it should be clearly understood that it is in no way limited to this, and that it is equally advantageous for teaching telegraphy, stenography, languages, etc.

Further, the use of the invention is not limited to teaching, but it may be used equally well for recreational purposes—for instance, the phonograph may reproduce a musical selection at a remote place, and the sound may be conveyed between rows of cots in a hospital, for example, where it will be only audible to those who care to listen and use the listening tubes. This will in no way disturb those whose conditions are more serious. In this case, also, the speaking tube 101 may be used for personal talks or other entertainment. In fact, the sound-conveying device may even be connected to an electrically-operated, sound-producing device, such as a telephone receiver—and thus, a large number of persons may listen with the use of one receiver.

Obviously, the sound-receiving stations may be arranged in any suitable way, and it should be understood that the arrangement shown in the drawing is merely one of a large number, arbitrarily selected for the purpose of illustration.

Variations and modifications may be used within the scope of this invention, as defined by the appended claims, and portions of the improvements may be used without others.

Having now described the invention, what is claimed as new, and for which Letters Patent is desired, is:

1. An apparatus of the character described including sound-reproducing means, sound-conveying means, a coupling device between the sound-reproducing means and the sound-conveying means and a plurality of listening tubes connected to said sound-conveying means at points at different distances from the sound-reproducing means, and means for causing the sounds emitted at such different points to be substantially the same.

2. An apparatus of the character described including, a relatively long sound-conveying tube having a plurality of tubular sections of gradually decreasing diameter, and sound-outlet means for each of the sections of gradually increasing diameter.

3. An apparatus of the character described including a relatively long sound-conveying tube having a plurality of separable tubular sections of gradually decreasing diameter, and coupling members for said sections each having a plurality of sound-outlet passages.

4. An apparatus of the character described including a relatively long sound-conveying tube, sound-outlet means therefor having a passage, a second tubular section coextensive with the first section and being of smaller diameter, and sound-outlet means for the second tubular section having a passage appreciably greater in diameter than the passage of the first sound-outlet means passage.

5. The combination in a class-room, or the like, having, a plurality of seats, desks, or the like, for a plurality of individuals, arranged at different distances from a sound source, sound-receiving means located at said seats, desks or the like, a plurality of sound-conducting means in communication with the sound source adapted to convey sound to the sound receiving means for the individuals, and means whereby said sound is transmitted in equal intensity and volume to the individuals located at different parts of the room.

6. An apparatus of the character described, including a sound source, a plurality of sound-conducting means in communication therewith adapted to conduct sound to points at varying distances from the sound source, a coupling device between the sound source and the sound conducting means, and means whereby the sound is emitted in equal intensity and volume at said various points.

7. The method of producing sound at a plurality of points at varying distances from the sound source, which consists in producing the sound at its source in increased volume and intensity over normal, conveying the sound to such points and proportioning the passage of the sound through sound-conveying means and its emission at the plurality of points, so that it will be of the desired normal intensity and volume at all of the points of emission.

8. The method of transmitting sound to a plurality of points at varying distances from the sound source, which consists in providing sound-conduit of gradually decreasing cross-sectional area and providing sound-outlets of gradually increasing size.

9. The method of transmitting sound to a plurality of points at varying distances from the sound source, which consists in decreasing the cross-sectional area of the sound-conduit proportionately as the sound is emitted.

10. The method of transmitting sound to a plurality of points at varying distances from the sound source, which consists in gradually increasing the area of the sound-outlets proportionately as the sound is emitted.

11. The method of transmitting sound to a plurality of points at varying distances from the sound source, which consists in proportionately increasing the velocity pressure and the size of the sound-outlets as the sound is emitted.

12. An apparatus of the character described including sound-reproducing means, a relatively long sound-conveyor to transmit sound to a plurality of spaced sound-receiving stations and having a tube gradually decreasing in diameter in the direction of sound transmission at each sound-receiving station, and a coupling device between the sound-reproducing means and the sound-conveyor.

13. An apparatus of the character described including a relatively long sound-conveying tube having a plurality of tubular sections of gradually decreasing diameter, and coupling members for said sections each having outlet means.

14. The method of producing and transmitting sound to points of reception at varying distances, with substantially equal loudness and clarity which consists in producing a sound of such intensity and volume as to be sufficiently clear and loud at the most remote point, transmitting the sound along a way to the points of reception, and decreasing the volume and intensity of the sound delivered at the points of reception as the sound origin point is approached in proportion to the number of such points along the way.

15. The method of compensating for the dissipation of sound transmitted from a single sound source to a plurality of points at varying distances from the sound source, which consists in gradually increasing the velocity pressure of the remaining sound energy as part of the sound is emitted.

16. The method of producing sound at a plurality of points at varying distances from the sound source, which consists in producing the sound at its source in increased volume and intensity, conveying the sound to such points and emitting it, and allowing the passage of sound of only the desired normal intensity and volume through the points of emission.

17. An apparatus of the character described including a relatively long sound-conveying tube having a plurality of tubular sections of gradually decreasing diameter, and coupling members for the sections having sound-outlets, disposed at the ends of the sections, and of gradually increasing diameter.

18. In combination, a phonograph, means connected to the phonograph for conveying sound to points remote from the phonograph, and an operator's speaking-tube also connected to the sound-conveying means.

19. In combination, a mechanical source of sound, means of conveying sound to points remote therefrom, and means connected to the last-named means for transmitting to the sound-conveying means, vocally produced sounds made other than by mechanical means.

20. In combination, a phonograph, a sound-conduit connected thereto for conveying sound to remote points, an operator's speaking-tube connected to the sound-conduit, and a valve for cutting off from the conduit, either the phonograph or the speaking-tube.

21. In combination, a phonograph, a sound-conduit for conveying sound to remote points, an operator's speaking tube connected to the conduit, and a control device adapted to connect either the speaking tube or the phonograph, or both the speaking-tube and the phonograph to the conduit.

22. An apparatus of the character described for use by groups of persons seated at desks or tables, including sound-reproducing means, sound-conveying means, a plurality of listening tubes connected to the conveying means for use by such persons, and means for supporting said sound-conveying means in the desired positions and independently of the sound-reproducing means and the desks or tables.

Signed at Bridgeport, in the county of Fairfield and State of Connecticut, this 12th day of February, A. D. 1924.

CHARLES K. WOODBRIDGE.